Jan. 11, 1949.   W. H. FRANK   2,458,583
PROTECTIVE DEVICE FOR USE WITH ENCLOSED
BUS BAR DISTRIBUTION SYSTEMS
Original Filed Dec. 6, 1943   2 Sheets-Sheet 1

INVENTOR.
William H. Frank
BY
Daniel J. Cullen

Jan. 11, 1949.  W. H. FRANK  2,458,583
PROTECTIVE DEVICE FOR USE WITH ENCLOSED
BUS BAR DISTRIBUTION SYSTEMS
Original Filed Dec. 6, 1943  2 Sheets-Sheet 2

INVENTOR.
William H. Frank
BY
Daniel G. Cullen

Patented Jan. 11, 1949

2,458,583

UNITED STATES PATENT OFFICE 2,458,583

PROTECTIVE DEVICE FOR USE WITH ENCLOSED BUS BAR DISTRIBUTION SYSTEMS

William H. Frank, Detroit, Mich., assignor to Bulldog Electric Products Company, Detroit, Mich.

Continuation of application Serial No. 513,145, December 6, 1943. This application July 1, 1947, Serial No. 758,251

8 Claims. (Cl. 175—294)

1

This application relates to electrical distribution systems and particularly to protective devices for such system, and is a continuation of my prior application, Serial No. 513,145 of December 6, 1943, now abandoned.

This application disclosed a device adapted to be plugged into any plug-in point of a bus duct of the character shown in my Patent No. 2,041,675 and having or adapted to be connected to a protective element energized and activated, upon a rise in temperature within the bus duct in the vicinity of the bus bars to an excessive degree, to provide an alarm, or to open the bus bar circuit, etc.

In such a system, numerous runs of bus duct extend in mains and branches over a large area of a factory or the like and at closely spaced points, for example 18" apart, there are access openings for plug-in devices of various forms. The device hereof is one form of plug and it may be plugged into any access point of the system and as many such devices may be used as are required.

In addition, the construction of such system and of the device hereof are such that such devices may be used at any desired points of the system; a device may be plugged into the system at any point, wherever it seems desirable at any time to install such a device, the determination being dependent on the environmental conditions of the points of the system as they may change from time to time. Such a device is a self-contained protective unit which is mounted on a bus duct, measures the temperature within such bus duct at the point of application, is energized by the bus bars of such bus duct and protects such bus duct by providing an alarm or by opening the circuit of which the bus bars of such circuit form a part.

For an understanding of the protective device herein disclosed, reference should be had to the appended drawings.

In these drawings.

Figure 1:
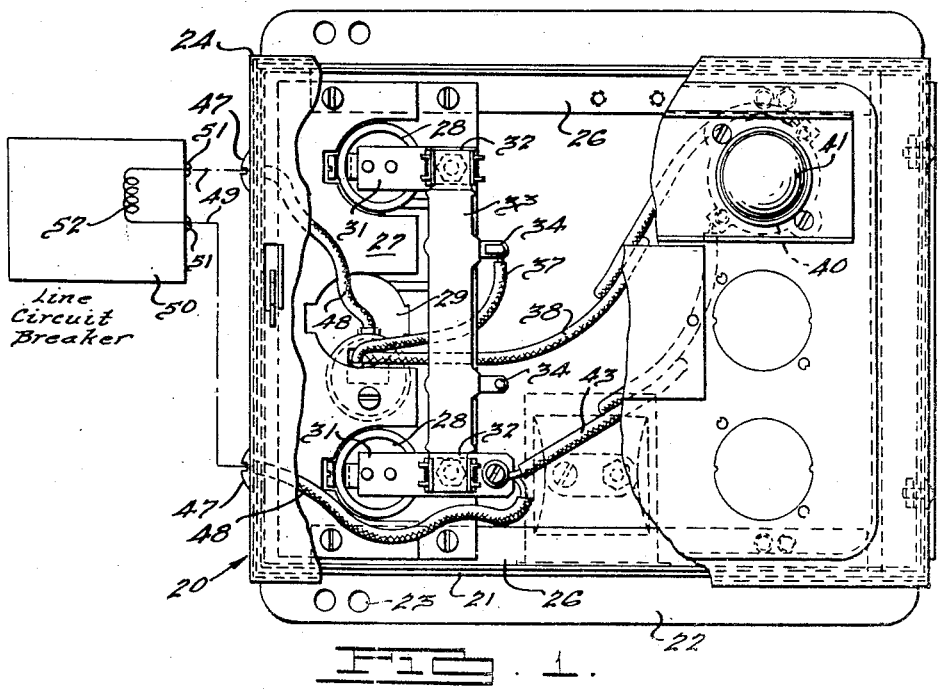
Figs. 1, 2 and 3 are respectively front, side and end views of the protective device.
Figure 2:
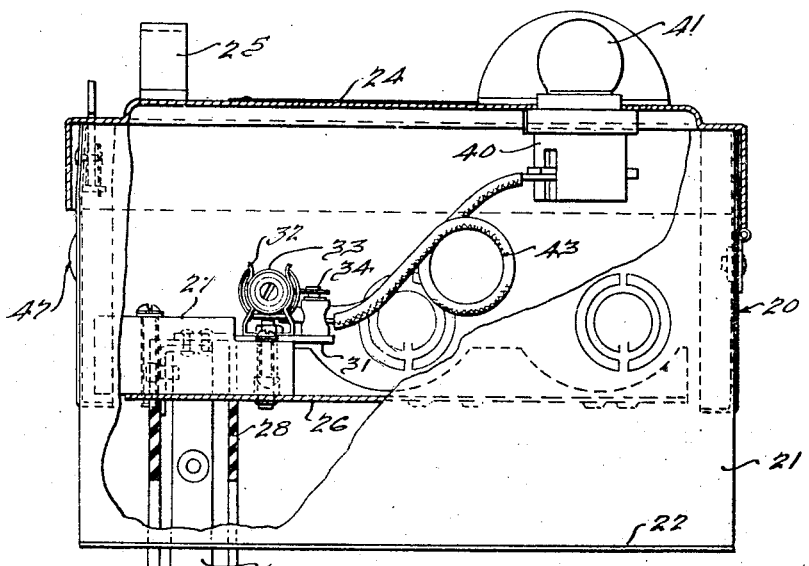
Figure 3:
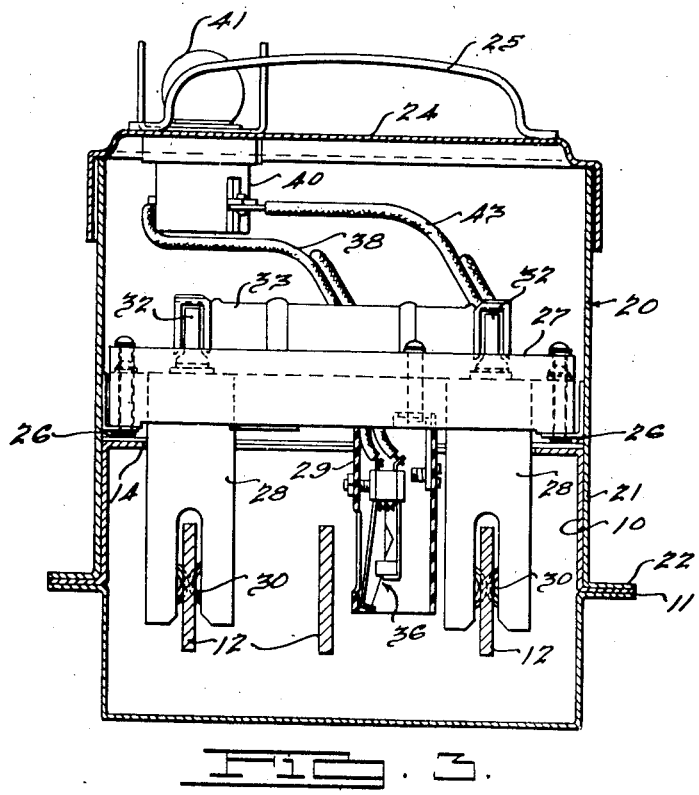
Figure 4:
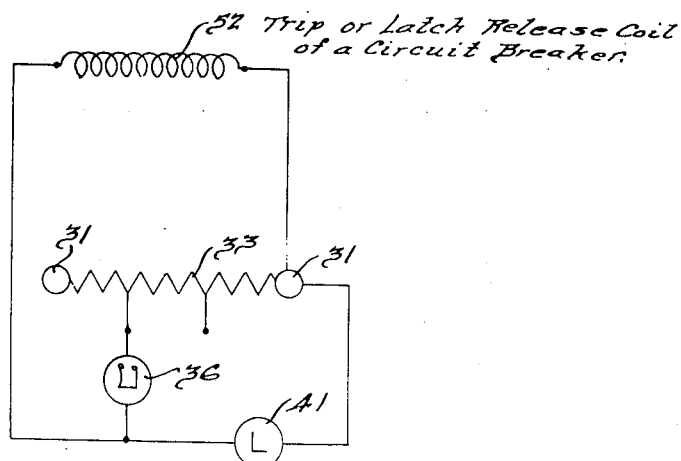
Fig. 4 is a wiring diagram.

Fig. 3 shows, in cross section, an electrical distribution system comprising a duct or casing 10 formed with flanges 11 and containing bus bars 12. At suitable points along the run of the duct 10 are prong entrances or apertures 14 in the form of crescent shaped slots whereby each aperture straddles the three bus bars 12 and each aperture can be entered into by three prongs of a plug for contact with the three bus bars. Branch plugs are shown in the aforesaid patent for establishing connection between a three conductor branch or load circuit through the plug-in device to the three bus bars.

In order to furnish an alarm or other protective action, in the event the temperature in the bus duct exceeds a predetermined amount, I have provided a protective device which I will now describe.

The protective device includes a sheet metal support or box 20 having an open back, having extended sides 21 formed with flanges 22 which may be attached to the duct flanges by bolts passing through the bolt holes 23 of the box flanges 22 and into the flanges 11 of the duct, whereby the box 20 may be removably mounted on the duct. The open back of the box 20 is closed by the duct itself. The open front of the box is closed by a hinge cover 24, having a pull handle 25.

Extending from side to side of the box 20 and suitably mounted on the sides as by means of the brackets 26 is a block 27 of insulation. Mounted on that block in a manner to project through the open back of the box are three prongs 28, 29 and 29. The prongs 28 are formed with contact fingers 30 and are positioned and formed to engage and make contact with the two outside busses 12, and the prongs themselves are formed with straps 31 which mount fuse holders 32 within the box, these providing connectors and holders for the ferrule ends of a resistor 33, provided with connector tap off lugs 34, which can be selected so that a specific portion of the resistor can be tapped off. Resistor 33 serves as a potentiometer so as to provide a desired voltage for the alarm or protective means 41 or 52, in the event that the voltage across the bus bars 12 is higher than that desired for the alarm.

The center prongs 29, also mounted on the block 27, is positioned so as not to engage the center bus bar. This prong 29 is not formed as a contact prong, but rather is formed as a mount for a thermally responsive or bimetal switch 36, normally open but adapted to close when the temperature surrounding the switch exceeds a predetermined amount. The prong 29 and particularly the thermally responsive switch thereof is thus located within the duct when the box 20 is mounted thereon, in a position intimately associated with the bus bars so as to respond proportionately to the temperatures of the bus bars. One of the elements of the switch is connected by a conductor 37 to one of the tap-offs 34 of the resistor 33. Another conductor 38, connected to the other element of the switch 36, is connected to a lamp socket 40 mounted on cover 24 and providing a holder and connector for a lamp 41 which forms a protective means in the nature of an alarm. The lamp socket is connected to the conductor 38 and thus to the switch 36, and through another conductor 43 is connected to one of the holders 32 for the end of the resistor.

Formed on one end of the box are binding posts 47 which are connected respectively by conductors 48 to the same portions of the device to which are connected the terminals of the conductors 38 and 43 which connect to the lamp socket 40. Thus, one of the conductors 48 connects to the thermally responsive switch 36, just as does the conductor 37, and one of the conductors 48 connects to one of the fuse holders 32, as does the conductor 43. A pair of conductors 49, not built into the protective device itself, but located to extend from the protective device to a main line circuit breaker 50, is connected to the binding posts 47 of the device, and also to binding posts 51 of the circuit breaker. This breaker forms another protective means inasmuch as it controls the energy source for the bus bars 12. This circuit breaker 30 may be located at a point remote from the device 20, being connected to the device 20 through the conductors 49.

The circuit breaker 50 may be of any suitable type; it may be a normally closed breaker, actuated to open automatically upon the closing of the circuit through the conductors 48 and 49, by the closing of the switch 36, and actuated or energized from the bus bars 12 through the contacts 30. For example, the circuit breaker is shown as having a shunt trip coil 52 which, when energized, opens a normally closed latch of the breaker so as to release the contactors of the circuit breaker to open the lines which form the source for the bus bars 12, upon the closing of the branch or shunt circuit from the bus bars 12, through the contacts 30, the fuse holders 32, and the switch 36, through the conductors 48 and 49.

The action of the device is as follows:

Upon the attainment of an excessive temperature within the duct, the switch 36 closes the control circuit to the lamp 41 and to the shunt trip coil 52 of the breaker 50, to produce a protective action, either an alarm by the lighting of the light 41 and/or a protective circuit opening by the opening of the breaker 50. When the temperature within the duct returns to a safe point or level, the switch 36 opens, once more to open the control circuit which supplies the light 41 and the circuit breaker shunt trip coil 52 and these are no longer energized and no longer function to alarm in one case or to open the circuit in the other.

It will be observed that the protective device herein disclosed is a unitary self-contained device which does not require to be wired to the bus duct it is intended to protect, but rather may be plugged into or associated with that bus duct directly at any point thereof in exactly the same way that any branch plug is plugged into the bus duct.

It will also be observed that the device hereof is responsive to the temperature of a feeder system, the bus bars and casing, rather than to the temperature of a branch load device, and is energized by the feeder system to which it responds rather than by any other system and that it protects the feeder system to which it responds and which energizes it.

It will also be observed that the control circuit established in the device and shown as activating the lamp 41 or the trip coil 52 of a circuit breaker may be considered as a control circuit for activating any type of protective device, whether it be a lamp 41 or a trip coil 52 or an audible signal, such as a bell, not shown, or a flag to be moved back and forth, not shown, or any other type of protective action may be obtained.

It will also be observed that though the device is shown as having two activated devices, the lamp 41 and the trip coil 52, that in some instances, binding posts 47 and conductors 48 may be omitted, so that the device has only one activated device, the lamp 41. Also, it is possible to omit the lamp socket 40 and the conductors 38–43, retaining connectors 47 and conductors 48, so that only one activated device, the trip coil 52, is retained.

Now having described the protective device herein disclosed, reference should be had to the claims which follow:

I claim:

1. For use with an enclosed bus bar distribution system comprising an enclosing casing surrounding bus bars and having numerous access apertures in the wall thereof at spaced points for receiving plug-in devices, a plug-in device comprising a support, means for removably mounting it on the outside of the casing at an aperture, projecting members mounted on the support and projecting from it so as to be insertable into the casing through such aperture, certain of the projecting members being formed as contact fingers to engage and make contact with the bus bars in the casing, another of the projecting members being in the form of a thermally responsive switch adapted to respond to the temperature within the casing near the bus bars, an electrically energizable protective means, and connections for connecting said contact fingers in series through said protective means and said switch, whereby such protective means may be energized by said bus bars through said contact fingers and switch.

2. In combination with a bus bar system comprising bus bars and a casing around them, said casing having numerous access openings at spaced points for receiving plug-in devices, a plug-in device comprising a support removably mounted on the outside of said casing at an opening and having three projecting members mounted thereon and projecting therefrom into said casing through said opening, two of said projecting members having contact fingers engaging and making contact with said bus bars in the casing, the third projecting member being in the form of a thermally responsive switch, responsive to the temperature within the casing, and an electrically energizable protective means, and connections for connecting said contact fingers in series through said protective means and said switch, whereby such protective means may be energized by said bus bars through said contact fingers and switch.

3. For use with an enclosed bus bar distribution system comprising an enclosing casing surrounding bus bars and having numerous access apertures in the wall thereof at spaced points for receiving plug-in devices, a plug-in device comprising a support, means for removably mounting it on the outside of the casing at an aperture, projecting members mounted on the support and projecting from it so as to be insertable into the casing through such aperture, certain of the projecting members being formed as contact fingers to engage and make contact with the bus bars in the casing, another of the projecting members being in the form of a thermally responsive switch adapted to respond to the temperature within the casing near the bus bars, an electrically energizable protective means, and connections for connecting said contact fingers in series through said protective means and said switch, whereby such protective means may be energized by said bus bars through said contact fingers and switch, said protective means being mounted on said support, whereby said support, said projecting members and said protective means together form a unitary self contained assembly.

4. In combination with a bus bar system comprising bus bars and a casing around them, said casing having numerous access openings at spaced points for receiving plug-in devices, a plug-in device comprising a support removably mounted on the outside of said casing at an opening and having three projecting members mounted thereon and projecting therefrom into said casing through said opening, two of said projecting members having contact fingers engaging and making contact with said bus bars in the casing, the third projecting member being in the form of a thermally responsive switch, responsive to the temperature within the casing, and an electrically energizable protective means, and connections for connecting said contact fingers in series through said protective means and said switch, whereby such protective means may be energized by said bus bars through said contact fingers and switch, said protective means being mounted on said support, whereby said support, said projecting members, and said protective means together form a unitary self contained assembly.

5. For use with an enclosed bus bar distribution system comprising an enclosing casing surrounding bus bars and having numerous access apertures in the wall thereof at spaced points for receiving plug-in devices, a plug-in device comprising a support, means for removably mounting it on the outside of the casing at an aperture, projecting members mounted on the support and projecting from it so as to be insertable into the casing through such aperture, certain of the projecting members being formed as contact fingers to engage and make contact with the bus bars in the casing, another of the projecting members being in the form of a thermally responsive switch adapted to respond to the temperature within the casing near the bus bars, an electrically energizable protective means, and connections for connecting said contact fingers in series through said protective means and said switch, whereby such protective means may be energized by said bus bars through said contact fingers and switch, said protective means being remote from said support but adapted to be electrically connected to it through said connections.

6. In combination with a bus bar system comprising bus bars and a casing around them, said casing having numerous access openings at spaced points for receiving plug-in devices, a plug-in device comprising a support removably mounted on the outside of said casing at an opening and having three projecting members mounted thereon and projecting therefrom into said casing through said opening, two of said projecting members having contact fingers engaging and making contact with said bus bars in the casing, the third projecting member being in the form of a thermally responsive switch, responsive to the temperature within the casing, and an electrically energizable protective means, and connections for connecting said contact fingers in series through said protective means and said switch, whereby such protective means may be energized by said bus bars through said contact fingers and switch, said protective means being remote from said support but adapted to be electrically connected to it through said connections.

7. For use with an enclosed bus bar distribution system comprising an enclosing casing surrounding bus bars and having numerous access apertures in the wall thereof at spaced points for receiving plug-in devices, a plug-in device comprising a support, means for removably mounting it on the outside of the casing at an aperture, projecting members mounted on the support and projecting from it so as to be insertable into the casing through such aperture, certain of the projecting members being formed as contact fingers to engage and make contact with the bus bars in the casing, another of the projecting members being in the form of a thermally responsive switch adapted to respond to the temperature within the casing near the bus bars, an electrically energizable protective means, and connections for connecting said contact fingers in series through said protective means and said switch, whereby such protective means may be energized by said bus bars through said contact fingers and switch so that the same single distribution system mounts said device, energizes the protective means of said device, supplies the temperature condition to which said device responds, and is the system that is protected by said device.

8. For use with an enclosed bus bar distribution system comprising an enclosing casing surrounding bus bars and having numerous access apertures in the wall thereof at spaced points for receiving plug-in devices, a plug-in device comprising a support, means for removably mounting it on the outside of the casing at an aperture, projecting members mounted on the support and projecting from it so as to be insertable into the casing through such aperture, certain of the projecting members being formed as contact fingers to engage and make contact with the bus bars in the casing, another of the projecting members being in the form of a thermally responsive switch adapted to respond to the temperature within the casing near the bus bars, an electrically energizable protective means, and connections for connecting said contact fingers in series through said protective means and said switch, whereby such protective means may be energized by said bus bars through said contact fingers and switch so that the same single distribution system mounts said device, energizes the protective means of said device, supplies the temperature condition to which said device responds, and is the system that is protected by said device.

WILLIAM H. FRANK.

REFERENCES CITED

The following references are of record in the file of this patent:

UNITED STATES PATENTS

| Number | Name | Date |
| --- | --- | --- |
| 1,456,091 | Betts | May 22, 1923 |
| 1,729,561 | Vaughan | Sept. 24, 1929 |
| 1,782,458 | Brennen | Nov. 25, 1930 |
| 2,056,040 | Dozler | Sept. 29, 1936 |
| 2,059,987 | Frank et al. | Nov. 3, 1936 |
| 2,088,105 | Frank et al. | July 27, 1937 |
| 2,323,776 | Johnson | July 6, 1943 |